(12) United States Patent
Piri et al.

(10) Patent No.: US 12,309,585 B1
(45) Date of Patent: May 20, 2025

(54) SYSTEMS AND METHODS FOR USER AUTHENTICATION ON SHARED MOBILE DEVICES

(71) Applicant: IDMELON TECHNOLOGIES INC., Vancouver (CA)

(72) Inventors: Bahram Piri, Vancouver (CA); Hassan Seifi, Vancouver (CA)

(73) Assignee: IDMELON TECHNOLOGIES INC., Vancouver (CA)

( * ) Notice: Subject to any disclaimer, the term of this patent is extended or adjusted under 35 U.S.C. 154(b) by 0 days.

(21) Appl. No.: 18/910,161

(22) Filed: Oct. 9, 2024

(51) Int. Cl.
*G06F 7/04* (2006.01)
*H04W 12/06* (2021.01)

(52) U.S. Cl.
CPC .................................. *H04W 12/06* (2013.01)

(58) Field of Classification Search
CPC ........ H04W 12/06; G06F 21/30; G06F 21/32; G06F 21/44; H04L 9/0866; H04L 63/0492; H04L 63/10
See application file for complete search history.

(56) References Cited

U.S. PATENT DOCUMENTS

| | | | |
|---|---|---|---|
| 9,887,983 B2 * | 2/2018 | Lindemann | H04L 9/006 |
| 2019/0073470 A1 * | 3/2019 | Shirakawa | G06F 21/604 |

(Continued)

OTHER PUBLICATIONS

Luke et al, Using Secret Sharing to Improve FIDO Attack Resistance for Multi-Device Credentials, May 21, 2023, IEEE, pp. 49-56 (Year: 2023).*

(Continued)

*Primary Examiner* — Philip J Chea
*Assistant Examiner* — Jenise E Jackson
(74) *Attorney, Agent, or Firm* — Norton Rose Fulbright Canada LLP; Maya Medeiros

(57) ABSTRACT

Systems and methods for secure and efficient user authentication on shared mobile devices, such as smartphones and tablets. This solution leverages the capabilities of RFID/NFC cards, access cards, and biometric sensors to establish seamless and personalized user authentication. An authenticator application communicates with a remote authentication service to either register passkeys locally for platform-wide use or forward authentication requests for remote processing, depending on configuration. The authenticator application orchestrates communication between the user, mobile device, and authentication service, creating a secure framework for various applications. Upon successful authentication, the system transforms the mobile device into a platform authenticator, making passkeys available across native apps and browsers. This system enhances security by integrating user identifiers with hosted authenticators that are securely managed by the authentication service. By tapping NFC-enabled cards or utilizing a bridge device for data extraction, users can seamlessly engage with the shared mobile device environment, benefitting from robust security measures associated with FIDO authentication. The system encompasses the bridge device, which serves as an intermediary for data transmission, efficiently communicating between RFID/NFC devices and mobile devices using Bluetooth Low Energy (BLE) technology. Biometric authentication operates similarly to RFID/NFC-based methods, where user identity is verified through an authentication service, and passkey support is provided for that specific user. The authentication service hosts user authenticators and passkeys in a secure, transportable format, configurable to be fetched to shared mobile devices or handled remotely. This system allows adaptable FIDO2/WebAuthn security protocols across multiple devices, enhancing user convenience while ensuring system integrity and security in shared device scenarios.

14 Claims, 8 Drawing Sheets

(56) References Cited

U.S. PATENT DOCUMENTS

| | | | | |
|---|---|---|---|---|
| 2021/0357483 A1* | 11/2021 | Sharma | ........... | G06F 21/32 |
| 2022/0239660 A1* | 7/2022 | Shimamoto | ........... | H04W 12/06 |
| 2023/0179589 A1* | 6/2023 | Kopack | ........... | H04L 63/18 |
| | | | | 726/4 |
| 2024/0113886 A1* | 4/2024 | Bhandarkar | ........... | H04L 9/3271 |

OTHER PUBLICATIONS

Guo et al, Extending Registration and Authentication Processes of FIDO External Authenticator with QR Codes, Jan. 29, 2021, IEEE, pp. 518-529. (Year: 2021).*

* cited by examiner

SYSTEMS AND METHODS FOR USER AUTHENTICATION ON SHARED MOBILE DEVICES

FIELD

Embodiments described herein generally relate to user authentication on shared mobile devices utilizing identifiers such as, for example, Radio Frequency Identification (RFID) cards, Near-field Communication (NFC) cards, and biometric data, including but not limited to facial recognition and fingerprint scanning.

INTRODUCTION

Using a password entails security and performance issues and challenges. Standards and protocols such as Fast Identity Online (FIDO) provide users passwordless authentication using security keys (e.g., smartphone or hardware security key in the term of authenticator). Users interact with online resources (e.g., web browsers or applications as relying party) that utilize the WebAuthn API to register and authenticate themselves using FIDO Client to Authenticator Program (CTAP) with an authenticator. The authenticator can register a user with a given relying party and later assert possession of the registered credential, and optionally verify the user, when requested by the relying party.

FIDO2 passwordless authentication systems allow users to authenticate with a secure device instead of a password and assert their identity to systems with a strong public key credential rather than a shared secret (e.g., a password). The credentials belong to the user and are managed by the authenticator, with which the relying party application interacts through the client platform (e.g., a browser application). The relying party application can (with the user's consent) request the browser or operating system to create a new credential for future use by the relying party. The relying party application can also request the user's permission to perform authentication operations with an existing credential.

This method of authentication requires an authenticator which is a device or software that generates, stores, and uses public key credentials to verify a user's identity. It interacts with a web application (e.g. relying party) to perform cryptographic operations for secure authentication. Authenticators can be built into devices (platform authenticators) or can be external. Authenticators secure user credentials and ensure privacy by requiring user consent for each authentication action.

The use of secure access systems have various applications, including but not limited to access control, payment, and so on. Secure access systems are widely used to ensure only authorized personnel are permitted entry to a building or area, such as allowing an employee to enter their office but not an unauthorized person, for example. Authentication is typically achieved by use of a short-range wireless communications module such as an RFID tag or access card being presented at close range to a reader located near an entry point to a secure area. The reader, or associated local control unit, may contain the necessary information to authenticate the tag or, in many cases, will be connected to a central authentication unit, and if the person is authorized to enter the secure area, the associated door will be unlocked or opened. An example of such an environment is large organizations like manufacturers, which often use technologies such as secure access systems (e.g., Radio Frequency Identification-RFID). Another technology that can be used in this type of organization, is Near Field Communication (NFC) which can be used for different equipment such as smart cards, smartphones or generally in mobile devices.

SUMMARY

Embodiments described herein relate to a method and system that utilize an authenticator to identify the user and perform public key cryptography in accordance with W3C Web Authentication (WebAuthn) standards. For shared mobile devices, the authenticator leverages a unique identifier, such as an RFID/NFC card or biometric data (e.g., facial recognition or fingerprint), to associate the user with their FIDO2 credentials (passkeys). These credentials are then used to authenticate the user on the shared device.

Shared mobile devices are portable electronic tools, including but not limited to smartphones and tablets, engineered for utilization by numerous individuals within diverse contexts. These devices are not allocated to specific users and are designed for transient or communal usage. They find relevance in public locales, professional environments, educational institutions, healthcare centers, and retail establishments, furnishing effortless entry to digital content and amenities. The notion of "shared mobile devices" embodies the concept of multiple users engaging with a singular device, eliminating the necessity for personal ownership. In this context, the present invention aims to leverage the capabilities of existing RFID/NFC cards to function as FIDO2 authenticators, facilitating user authentication for accessing shared mobile devices in a secure and efficient manner.

An authenticator is a cryptographic entity, existing in hardware or software, which can register a user and later assert possession of the registered public key credential, and optionally verify the user, when requested by an application. Authentication operations refer to both registration and assertion requests and any other related requests.

In shared mobile devices, an authenticator app communicates with a remote authentication service that hosts authenticators and passkeys. When a user is identified using a unique identifier-such as an NFC/RFID card, biometrics (e.g., face or fingerprint)-their passkeys are loaded into the authenticator app for subsequent authentication. In some configurations, the passkeys or authenticator data are reset after the session, preparing the device for the next user. This ensures secure, personalized, and seamless authentication on shared devices.

In some embodiments, mobile devices can be equipped with Bluetooth Low Energy (BLE) technology, enabling seamless connectivity through Bluetooth, and in certain instances, Near Field Communication (NFC) for communication. In scenarios where both the mobile device is equipped with NFC capabilities and the user possesses an NFC-enabled card, the inherent NFC reader within the mobile device becomes a valuable asset. This reader can be employed to extract pertinent card information, particularly identifiers, which serve as essential components in the subsequent authentication process. The obtained card information plays a pivotal role in pinpointing a remote authenticator on the server side, specifically tailored for FIDO2 authentication. The unique identifiers obtained from the card establish a precise connection with the corresponding remote authenticator, thus ensuring a highly secure and personalized authentication experience.

Embodiments described herein relate to a method and system for user authentication. The method and system can involve a bridge device that constitutes a computing device embedded with an operating system and tailored to accommodate a suitable card reader mechanism. Its primary function is to relay crucial RFID/NFC card data, notably the identifier, to the shared mobile device. This cardinal data subsequently serves as the key to pinpointing the user's distinct FIDO2 authenticator, hosted remotely. For communication, the bridge device can employ Bluetooth Low Energy (BLE) technology, employing it as the transport medium. Moreover, the bridge device can undertake specific computations, configured to be executed over Received Signal Strength Indicator (RSSI) signals. This approach refines its communication strategy, enabling it to selectively establish connections with mobile devices in close proximity. This calibrated approach proves invaluable within a shared environment bustling with multiple users and their respective mobile devices. By judiciously integrating BLE, tailored communication algorithms, and RSSI-based calculations, the bridge device facilitates efficient data transmission to the nearby mobile device. This refinement ensures that the user authentication process remains secure and effective, even in multifarious user scenarios.

For example, if the mobile device lacks NFC capabilities or the card in use isn't inherently NFC-compatible (for example, a proximity card), the bridge device is designed to accommodate a suitable card reader for extracting essential card information. This bridge device further harnesses the power of Bluetooth Low Energy (BLE) technology to establish seamless communication with a nearby mobile device. Employing a customized algorithm in conjunction with Received Signal Strength Indicator (RSSI) thresholds, the bridge device effectively transmits the card information to the mobile device situated within close proximity. This algorithm-driven approach ensures precise and efficient communication between the bridge device and the mobile device. Once the mobile device successfully acquires this crucial card data, including its unique identifier, it becomes primed for processing FIDO2 authentication. In effect, this inventive approach ensures an uninterrupted authentication process, even in scenarios where NFC is absent or when card types diverge. It capitalizes on the capabilities of BLE and the specialized bridge device to facilitate secure and efficient authentication mechanisms, while employing the algorithm to optimize communication with nearby devices and leveraging the card's identifier for precise targeting of unique FIDO2 authenticators on the server side.

In some embodiments, the mobile device operates an authenticator application, which can be customized to offer authentication services to the device's operating systems, browsers, or applications. This versatile application is adept at receiving the user's authenticator identifier alongside authentication requests, which encompass activities like registration or login procedures.

In some embodiments, the authenticator application seamlessly integrates with the NFC interface or the BLE interface. This integration allows the application to directly receive the authenticator identifier. This identifier can be sourced either directly from the NFC interface or transmitted over the BLE interface from a specially configured bridge device. This bridge device is meticulously designed to read NFC/RFID cards accurately. In this collaborative process, the authenticator application then transmits the user's authenticator identifier and the corresponding authentication request to the remote authentication service.

In some embodiments, an authentication service handles FIDO authentication requests. The virtually hosted authenticators are under the management of the authentication service, constituting a secure and controlled environment. Each of these authenticators is meticulously configured to be exclusively accessible by a single user. This exclusivity is upheld through the association of a unique identifier, which the user possesses for authentication purposes. This identifier serves as a digital key, granting the user singular access to their corresponding authenticator. This tailored approach ensures that the authentication service can interact with the authenticator, retrieve pertinent data, and execute the authentication process, all while upholding robust security measures.

In an aspect, embodiments described herein relate to a system and method designed for facilitating shared access to mobile devices, such as tablets or iPads, utilizing a distinct identifier-derived from sources like biometric data, RFID/NFC tags, access cards, or similar codes-to meticulously pinpoint individual user FIDO2 authenticators. These identifiers serve as pivotal keys in the precise identification of associated user authenticators, culminating in the seamless integration of FIDO authentication processes within a shared, multi-user environment.

Embodiments described herein provide an improved authentication approach by uniquely identifying users using RFID/NFC cards or biometric data for example to orchestrate FIDO2 authentication against remote, hosted authenticators. In case of using RFID/NFC cards, each user's distinctive identifier (derived from the corresponding RFID/NFC tag or access card) is harnessed to accurately discern the associated authenticator. In practice, users can log in by tapping the RFID/NFC tag or access card either onto the bridge device or directly onto an NFC-enabled mobile device. When biometric data is used, the user provides the required input, such as facial recognition or fingerprint scanning, through built-in or external interfaces to the authenticator app on the shared mobile device. The app then identifies and authenticates the user against the pre-registered data in the authentication service. Once authentication is successful, the user's passkeys are securely loaded into the authenticator app and the operating system, enabling the device to function as a platform authenticator for use in internal browsers and applications. This transformative paradigm not only streamlines the authentication process but also elevates the concept of shared mobile device utilization, underpinned by secure authentication methodologies and technologies.

In an aspect, embodiments described herein pertain to a system and method for authenticating user and retrieving a user's passkeys from an authentication service into an authenticator app, subsequently registering these passkeys for use within the operating system, enabling the shared mobile device operates as a platform authenticator. Upon successful authentication, the passkeys can be utilized for further authentication processes across internal apps and browsers. The authenticator include a standard FIDO2 security key operated via software, utilizing an RFID/NFC card or biometric data (e.g., fingerprint or facial recognition) as the unique identifier. When an RFID/NFC card is used, an additional layer of security may be provided by a client PIN or security key PIN.

In an aspect, embodiments described herein relate to a system and method designed to facilitate the transfer of RFID/NFC data via a BLE interface to a mobile device, particularly when the mobile device lacks NFC support or the card in use isn't NFC-enabled. Central to this system is the bridge device, which acts as the conduit for this data transmission, enabling effective communication between different technologies and optimizing access to the mobile device.

In some embodiments, the bridge device assumes the form of a computing device equipped with a customized service. This service plays a pivotal role by receiving data emanating from an RFID/NFC reader, subsequently employing the BLE module to establish communication with a nearby mobile device. This orchestrated interaction takes place within close proximity, enhancing the efficacy of data exchange between the bridge device and the mobile device.

In some embodiments, the bridge device is embodied as a computing device and configured to establish direct communication between the NFC/RFID reader and the BLE module.

In accordance with an aspect, embodiments described herein relate to a system and method tailored for FIDO2 user authentication on shared mobile devices, including tablets and iPads. This innovative approach involves the virtual hosting of user-authenticators, which are made uniquely and securely accessible through the biometric identifiers or extraction of a distinct identifier from devices such as RFID/NFC tags or access cards. This approach ensures a robust and personalized authentication process within the shared mobile device environment, bolstered by the utilization of these unique identifiers for heightened security.

In some embodiments, the shared mobile device features an authenticator application, a curated selection of applications intended for login purposes, and a dedicated browser tailored to facilitate user logins across these applications.

In some embodiments, the shared mobile device is equipped with an NFC interface, enhancing its capability to directly receive data from NFC tags or access cards. This cohesive setup not only streamlines user authentication but also embraces NFC technology to expedite data acquisition, thereby optimizing the authentication process and user experience.

In accordance with an aspect, there is provided a system and method that allow for direct interaction by tapping the NFC tag or access card onto NFC-enabled mobile devices without needing a bridge device. In this scenario, the authenticator application seamlessly interfaces with the NFC interface residing on the mobile device. This interface facilitates the reception of the unique identifier directly from the NFC tag or access card. This streamlined process negates the requirement for an intermediary bridge device, underscoring a more direct and efficient approach to user authentication.

In accordance with an aspect, there is provided a system and method designed to enable an authenticator application on a mobile device to actively engage in communication with an authentication service. This interactive process encompasses the transmission of an authentication request, intricately linked to a user defined by a distinct identifier originating from sources like RFID/NFC access cards or biometric data. Subsequently, the authenticator application receives an authentication response from a remote authenticator hosted within the system. This response is then relayed back to the authenticator application for user verification. Upon successful verification, a seamless and automatic single sign-in capability is conferred, extending across all configured applications and relying parties accessible through the mobile browser. This comprehensive system enhances user convenience by simplifying the authentication process and harmonizing access to various applications and services.

In some embodiments, the device for creating the unique identifier is a radio frequency identification (RFID) access card or tag for authentication purposes.

In some embodiments, the device for creating the unique identifier is a Near Field Communication (NFC) access card or tag for authentication purposes.

In some embodiments, the BLE functionality integrated within the bridge device is meticulously configured to operate exclusively with a mobile device in immediate proximity. This configuration emulates the tactile tap experience, effectively replicating the authentication process. By restricting the BLE functionality to interactions within close range, the bridge device creates a seamless and secure means of authentication, mirroring the intuitive tap-based mechanism while ensuring that the communication remains confined to nearby devices for enhanced security and authenticity.

In some embodiments, the initiation of authentication requests transpires directly from the authenticator application itself, serving the explicit purpose of user authentication.

In some embodiments, authentication requests originate from a relying party, such as a native application, browser-based web application, or service. This request is passed to the authenticator app, which communicates with the authentication service to validate the user against a virtually hosted authenticator. Alternatively, the authenticator app can be configured to fetch and register the passkeys as multi-device passkeys within the operating system. This allows the device to function as a platform authenticator, handling passkey authentication locally and reducing reliance on the server for future authentication requests.

In some embodiments, the authenticator application and the authentication service can provide Single Sign-On (SSO) functionality for either a selection or all of the configured applications or relying parties residing on the mobile device. This unified approach ensures that an authenticated user gains streamlined access to the full array of configured applications, specifically tailored to that individual user. The SSO capability simplifies user interaction by eliminating the need for repeated authentications, consequently enhancing user convenience and navigational efficiency across the diverse range of applications or services.

In accordance with an aspect, embodiments described herein provide an authenticator application installed on a mobile device. This application undertakes a sequence of actions: it first receives an authentication request originating from a relying party, residing on the same mobile device. Subsequently, it engages in the retrieval and identification of the unique identifier, a task facilitated either by a nearby bridge device or directly from the NFC interface, contingent upon the mobile device's NFC capability. Once the unique identifier is obtained, the authenticator application proceeds to establish communication with the authentication service via a network connection, effectively engaging with an application residing on the network infrastructure. This collaborative interaction navigates the authentication process. The application sends the authentication request to the authentication service and awaits the corresponding authentication response. Upon receipt of the authentication response from the authentication service, the authenticator application relays the pertinent response back to the relying party. This orchestrated exchange of information finalizes the authentication and verification procedure, providing a comprehensive and secure mechanism for user authentication within the context of the mobile device's environment.

In accordance with an aspect, embodiments described herein provide an authenticator application installed on a shared mobile device. The application communicates with an authentication service to validate the user using a unique identifier, such as NFC/RFID or biometric data (e.g., facial recognition or fingerprint). Once the user is successfully authenticated by the service, the authenticator app forms a platform authenticator by loading the user's passkeys onto the device. These passkeys enable the user to seamlessly log in to native apps and browsers directly from the device. After the authentication session ends, the authenticator app can be configured to reset and clear the passkeys, ensuring the device is ready for the next user. This allows the shared mobile device to operate efficiently in multi-user environments, offering secure authentication tailored to each individual user while minimizing the need for network communication during the authentication process.

In accordance with an aspect, embodiments described herein utilize the FIDO2 authentication mechanism to validate the user against an authentication service and retrieve passkeys for local use. When the user presents an NFC/RFID card, the authenticator app may request a client PIN to complete the authentication. Upon successful verification by the authentication service, the user's passkeys are fetched and stored within the authenticator app, enabling login to native apps and browsers.

In accordance with an aspect, embodiments described herein provide an authenticator application installed on a shared mobile device that supports advanced session management. Passkeys and authentication data can be erased or cleared based on specific conditions, such as at the end of a shift, after a configurable time period, or following the use of a single-use passkey for authentication. This approach ensures the device remains secure and ready for the next user, optimizing security in shared environments.

In accordance with an aspect, embodiments described herein provide a bridge service, which manifests as a form of computing device. This bridge service seamlessly takes charge of receiving the unique identifiers associated with users. These identifiers are sourced from a connected reader device, including RFID/NFC readers, which is engaged upon detecting a tap of RFID/NFC tags or access cards. Additionally, the bridge service accommodates identifiers obtained from diverse devices, including biometric sensor readers capable of generating unique user codes. Upon acquiring these identifiers, the bridge service embarks on a multifaceted process. It initiates a BLE (Bluetooth Low Energy) connection with the authenticator application residing on a nearby mobile device. This connection is orchestrated by calculating proximity through the Received Signal Strength Indicator (RSSI). Subsequently, the bridge service transmits user information, which encompasses the identifier, to the authenticator application. The authenticator application seizes upon this transmitted information, utilizing it as a conduit for communication with the authentication service, which operates over a network infrastructure. This interaction enables the authenticator application to precisely identify virtually hosted authenticators, uniquely aligning them with the user in question. Furthermore, the authenticator application temporarily caches the user's authenticator data within the shared mobile device, thus laying the foundation for seamless and secure user authentication within the scope of the shared mobile device environment.

In accordance with an aspect, embodiments described herein provide an authentication service or application, securely hosted on a remote server across a network. This application assumes the pivotal role of virtually hosting, managing, and safeguarding authenticator data. Configured with precision, it establishes seamless mappings and associations between users and their unique identifiers, derived from sources such as RFID/NFC tags, access cards, or even generated through alternative means like biometric sensors. The authentication service's function is manifold: it is adept at receiving authentication requests and user-specific identifiers transmitted through the network from the authenticator application. Within its domain, it diligently establishes the crucial linkages between users and their distinct identifiers, effectively binding them to the corresponding virtual authenticators. When confronted with an authentication request, the authentication service deftly accesses the user's authenticator data, ushering in the verification and authorization process.

In accordance with an aspect, embodiments described herein provide a method tailored for authentication on shared mobile devices. Central to this method is the authenticator application, thoughtfully configured to harness the potential of RFID/NFC cards or alternate user identifiers, including biometric data, as virtual FIDO authenticators. These virtual authenticators encapsulate authenticator data, diligently hosted and managed in a secure environment, all while being conveniently accessible over a network. This method harmonizes the authenticator application with the unique capabilities of diverse user identifiers. The application serves as the gateway to these virtual FIDO authenticators, providing a cohesive and secure means of authentication across shared mobile devices. As a result, users can seamlessly engage with the shared mobile device environment while benefiting from the robust security measures associated with FIDO authentication, ultimately enhancing both user convenience and system integrity.

In accordance with an aspect, embodiments disclosed herein provide a system for secure user authentication on shared mobile devices. The system comprises an authenticator application installed on the mobile device and an authentication service accessible via a network, wherein the authentication service hosts virtual authenticators and passkeys. The authenticator application is configured to transmit authentication requests and unique identifiers-extracted by a reader (e.g., RFID/NFC or biometric data)-to the remote authentication service. The authentication service maps the unique identifiers to the corresponding virtual authenticators, processes the authentication requests, verifies the user, and returns authentication responses to the authenticator application. In another mode of operation, after successful user authentication, the system fetches the passkeys into the authenticator application, enabling it to function as a platform authenticator that handles subsequent authentication requests locally, without further communication with the authentication service. The system further incorporates session management, wherein passkeys are erased or cleared after a single use, at the end of a session, or after a configurable period, ensuring the device is secure and ready for the next user.

In some embodiments, the system includes a bridge device that communicates with the reader, over a connection, for extracting the unique identifiers and the mobile device for providing the unique identifiers. The bridge device facilitates data transfer between the reader and the mobile device for the authentication requests.

In some embodiments, the bridge device extracts the unique identifiers from one or more of RFID/NFC cards, access cards, and biometric sensors.

In some embodiments, the reader is an NFC/RFID reader.

In some embodiments, the mobile device is an NFC-enabled mobile device integrating the reader to directly receive the unique identifiers from NFC tags or access cards.

In some embodiments, the authenticator application resides on an NFC-enabled mobile device integrating the reader to receive the unique identifiers directly from NFC tags or access cards.

In some embodiments, the reader extracts the unique identifiers from at least one of RFID/NFC cards, access cards, tags and biometric sensors.

In some embodiments, the connection is a network connection using Bluetooth Low Energy (BLE).

In some embodiments, the bridge device comprises a Bluetooth Low Energy (BLE) module. The authenticator application can communicate with the bridge device over BLE to receive identifier data.

In some embodiments, the authentication requests are initiated from relying party applications or services. The authenticator application can enable single sign-on access to the applications or services upon successful authentication.

In some embodiments, each of the virtually hosted authenticators is associated with a user through a unique identifier.

In some embodiments, the reader captures and transmits unique biometric identifiers for user verification. The remote authentication service associates biometric identifiers with the virtually hosted authenticators to facilitate secure and personalized user authentication through the use of biometric data.

In some embodiments, the bridge device calculates proximity through RSSI signals to establish BLE connections with nearby mobile devices including the mobile device with the authenticator application.

In some embodiments, the system includes a secure connection between the remote authentication service and the authenticator application for seamless communication between the authenticator application and the remote authentication service for streamlined user authentication.

In accordance with an aspect, embodiments described herein provide a method for authentication on shared mobile devices. The method involves receiving authentication requests and unique identifiers form an authenticator application on a mobile device, mapping and binding unique identifiers to virtually hosted authenticators, processing authentication requests against the mapped authenticator's data, and transmitting authentication responses to the authenticator application for user verification.

In some embodiments, the method involves using a bridge device between a reader and the authenticator application to extract the unique identifiers.

In some embodiments, the method involves extracting unique identifiers from RFID/NFC cards, access cards, or biometric sensors.

In some embodiments, the method involves initiating communication between an authenticator application and an authentication service using the extracted identifiers.

In some embodiments, the method involves verifying user authentication based on the associated virtually hosted authenticator's data.

In some embodiments, the method involves calculating proximity through RSSI signals to establish BLE connections with nearby mobile devices including the mobile device with the authenticator application.

In accordance with an aspect, embodiments described herein provide a method for authentication on shared mobile devices. This method involves receiving authentication requests and unique identifiers from an authenticator application on a mobile device, mapping and binding the unique identifiers to virtually hosted authenticators, processing the authentication requests against the mapped authenticator's data, and transmitting authentication responses to the authenticator application for user verification.

In accordance with an aspect, embodiments described herein provide a system for authentication on shared mobile devices. This system involves an authenticator application residing on a mobile device and configured to interact with virtual FIDO authenticators, a remote authentication service configured to virtually host and manage authenticators and associated with unique identifiers, and a bridge device that can communicate with an NFC/RFID reader and a mobile device over BLE, facilitating data transfer for authentication.

In accordance with an aspect, embodiments described herein provide a method for user authentication using diverse identifiers. This method involves extracting unique identifiers from RFID/NFC cards, access cards, or biometric sensors before initiating communication between an authenticator application and an authentication service using the extracted identifiers. Then, the user authentication is verified based on the associated virtually hosted authenticator's data.

In accordance with an aspect, embodiments described herein provide a system for secure user authentication. The system includes an authentication service, an authenticator application on a mobile device, and a bridge device. The authentication service can remotely host authenticators, which are each associated with a unique identifier. The authenticator application on a mobile device communicates with the authentication service for user authentication. The bridge device facilitates data transfer between an NFC/RFID reader and the authenticator application over BLE.

In accordance with an aspect, embodiments described herein provide a method for seamless user authentication across applications. This method involves initiating authentication requests from relying party applications or services, transmitting authentication requests and unique identifiers to an authenticator application on a mobile device, establishing communication between the authenticator application and a remote authentication service for user verification, and enabling single sign-on (SSO) access to multiple applications upon successful authentication.

In accordance with an aspect, embodiments described herein provide a system for personalized authentication on shared mobile devices. The system includes a remote authentication service and an authenticator application on a mobile device. The remote authentication service hosts virtual authenticators, which are each linked to a user through a unique identifier. The authenticator application on a mobile device receives authentication requests and user identifiers. The authenticator application can then be used to communicate with the authentication service for secure user verification.

In accordance with an aspect, embodiments described herein provide a method for user authentication using biometric identifiers. This method involves capturing and transmitting unique biometric identifiers for user verification, associating biometric identifiers with virtually hosted authenticators, and facilitating secure and personalized user authentication through the use of biometric data.

In accordance with an aspect, embodiments described herein provide a system for enhanced security on shared mobile devices. The system includes a bridge device, an authenticator application on a mobile device, and a remote authentication service. The bridge device extracts unique identifiers from RFID/NFC cards, access cards, or biometric sensors. The authenticator application communicates with the bridge device over BLE for identifier data. The remote authentication service manages virtually hosted authenticators, verifying user authentication based on unique identifiers.

In accordance with an aspect, embodiments described herein provide a method for user authentication using a bridge device. The method involves extracting unique identifiers from RFID/NFC cards or access cards using a bridge device, initiating a BLE connection between the bridge device and a mobile device for data transfer, and transmitting the unique identifier to an authenticator application on the mobile device for authentication with a remote authenticator.

In accordance with an aspect, embodiments described herein provide a system for efficient user authentication. The system includes an authentication service, an authenticator application on a mobile device, and a secure communication between the authenticator application and the authentication service. The authentication service hosts and manages virtually hosted authenticators accessible through unique identifiers. The authenticator application on a mobile device receives authentication requests and user identifiers. User authentication can then be performed over the secure communication between the authenticator application and the authentication service.

In accordance with an aspect, embodiments described herein provide a method for accessing shared mobile devices securely. This method involves tapping NFC-enabled cards onto a bridge device to extract unique identifiers, establishing a BLE communication between the bridge device and a nearby mobile device for data transmission, and transmitting the unique identifier to an authenticator application on the mobile device for remote authentication.

In accordance with an aspect, embodiments described herein provide a system for streamlined authentication using NFC technology. The system includes a bridge device, an authenticator application on mobile device, and a remote authentication service. The bridge device can be equipped with an NFC/RFID reader and BLE module, extracting unique identifiers from NFC tags or access cards. The authenticator application on a mobile device communicates with the bridge device over BLE to receive identifier data. The remote authentication service manages virtually hosted authenticators, verifying user authentication based on the extracted identifiers.

In accordance with an aspect, embodiments described herein provide a method for facilitating NFC-based authentication. The method involves extracting unique identifiers from NFC tags or access cards, establishing communication between an authenticator application and a remote authentication service using the extracted identifiers, and processing authentication requests and responses for secure user verification.

In accordance with an aspect, embodiments described herein provide a system for comprehensive user authentication. The system includes a remote authentication service and an authenticator application on a mobile device. The remote authentication service hosts virtual authenticators accessible through unique identifiers. The authenticator application on a mobile device receives authentication requests and user identifiers. Upon successful authentication, single-sign-on (SSO) access can be enabled for configured applications and services.

In accordance with an aspect, embodiments described herein provide a method for dynamic authentication using BLE technology. This method involves calculating proximity through RSSI signals to establish BLE connections with nearby mobile devices, transmitting user information, including unique identifiers, from a bridge device to an authenticator application, and communicating with an authentication service via the authenticator application for user verification.

In accordance with an aspect, embodiments described herein provide a system for personalized single sign-on authentication. The system includes an authentication service and an authenticator application on a mobile device. The authentication service hosts and manages virtual authenticators, which are linked to users through unique identifiers. The authenticator application on a mobile device receives authentication requests and user identifiers. User authentication can then be streamlined using the seamless communication between the authenticator application and the authentication service.

In accordance with an aspect, embodiments described herein provide a method for secure NFC-based user authentication. The method involves utilizing NFC-enabled mobile devices to directly receive unique identifiers from NFC tags or access cards, initiating communication between an authenticator application and an authentication service using the acquired identifiers, and enabling efficient and secure user authentication without the need for an intermediary bridge device.

In accordance with an aspect, embodiments described herein provide a system for secure authentication with NFC technology. The system includes an authenticator application on NFC-enabled mobile devices, a remote authentication service, and streamlined communication between the authenticator application and the authentication service. The authenticator application on NFC-enabled mobile devices receives unique identifiers directly from NFC tags or access cards. The remote authentication service hosts virtual authenticators, verifying user authentication based on the received identifiers. User verification can then be performed using the streamlined communication between the authenticator application and the authentication service.

In accordance with an aspect, embodiments described herein provide a method for personalized user authentication using diverse identifiers. The method involves extracting unique identifiers from RFID/NFC cards, access cards, or biometric sensors, transmitting authentication requests and identifiers to an authenticator application on a mobile device, and initiating secure communication between the authenticator application and a remote authentication service for user verification.

In accordance with an aspect, embodiments described herein provide a system for secure user authentication using diverse identifiers. The system includes a bridge device, an authenticator application on a mobile device, and a remote authentication service. The bridge device extracts unique identifiers from RFID/NFC cards, access cards, or biometric sensors. The authenticator application on a mobile device communicates with the bridge device over BLE to receive identifier data. The remote authentication service manages virtually hosted authenticators, verifying user authentication based on the extracted identifiers.

In accordance with an aspect, embodiments described herein provide a method for efficient user access across applications. This method involves initiating authentication requests from relying party applications or services, transmitting authentication requests and unique identifiers to an authenticator application on a mobile device, communicating with a remote authentication service via the authenticator application for user verification, and enabling seamless single sign-on access to a range of applications upon successful authentication.

In accordance with an aspect, embodiments described herein provide a system for streamlined user authentication. The system includes an authentication service and an authenticator application on a mobile device. The authentication service virtually hosts and manages authenticators linked to users through unique identifiers. The authenticator application on a mobile device receives authentication requests and user identifiers. The authenticator application and authentication service securely communicate for user verification.

In accordance with an aspect, embodiments described herein provide a method for personalized user authentication with biometric identifiers. This method involves capturing and transmitting unique biometric identifiers for user verification, associating biometric identifiers with virtually hosted authenticators on a remote authentication service, and facilitating secure and personalized user authentication based on biometric data.

Many further features and combinations thereof concerning embodiments described herein will appear to those skilled in the art following a reading of the instant disclosure.

DESCRIPTION OF THE FIGURES

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale, and components within the figures may be depicted not to scale with each other.

Systems, devices, aspects, methods, and results are described in greater detail herein with reference to the following figures in which.

DETAILED DESCRIPTION

Example embodiments of systems and methods are now described in detail with reference to the figures.

To share mobile devices equipped with BLE using RFID/NFC cards for a passwordless authentication based on FIDO, authentication requests along with a unique identifier obtained from short-range wireless communication, such as a RFID/NFC tag or access card, must be received to identify the associated remote hosted authenticator to bind to the related user to forward the authentication request and receive a response to transmit back to the user, allowing the user to login to a list of available applications on the shared mobile device. A bridge device that creates a connection between RFID/NFC and BLE is needed to send the unique identifier to the nearby shared mobile device. An authentication service can be used to implement multiple authenticators for users and existing RFID/NFC cards can be used as the identifier to pinpoint the associated authenticators, enabling the shared devices to be used (e.g., tablets/iPads) for users.

An identifier (e.g. coming from a RFID/NFC tag or access card or even an individual's unique biometric attributes) can be used to uniquely identify an associated authenticator of users to implement FIDO authentication processes in a shared multi-user environment. In this case, users can login to a list of available applications using remotely hosted authenticators on a local network or a cloud server simply by tapping the RFID/NFC tag or access card on the bridge device or an NFC enabled card directly on the NFC enabled mobile device. The method comprises reading a machine-readable unique identifier using a bridge device (or directly on an NFC enabled mobile devices) that provides the unique identifier to the authenticator application to pass it through a network to the authentication service to uniquely identify a remotely hosted authenticator to process the authentication request and return the authentication response back to the user from the associated authenticator for login to a given list of applications on a nearby shared mobile device.

Figure 1A:
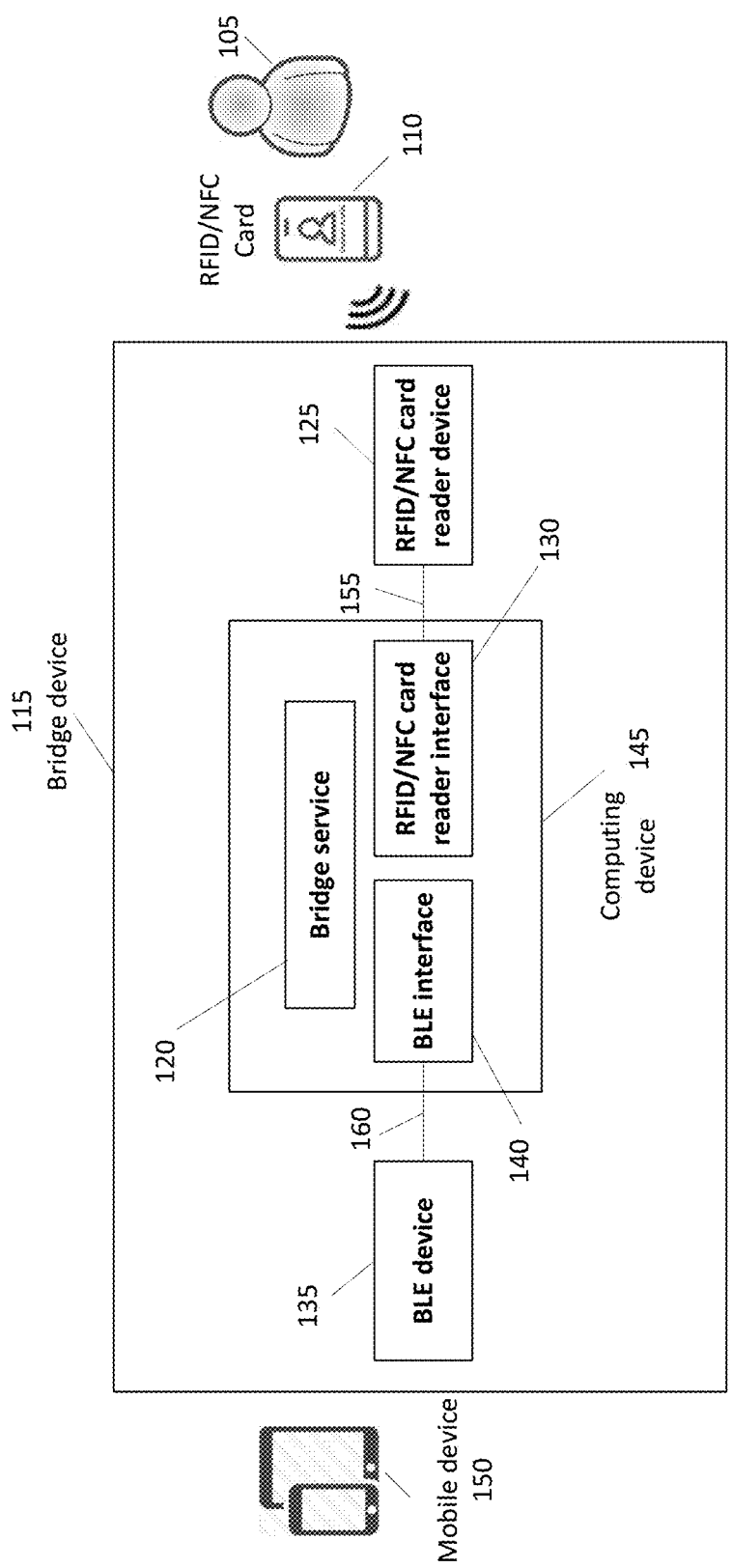
FIG. 1A shows an example system-architecture diagram for a bridge device that constitutes a computing device embedded with an operating system, tailored to accommodate a suitable card reader mechanism according to some embodiments described herein.

In FIG. 1A, system 100 illustrates a system-architecture diagram for making a bridge device that constitutes a computing device embedded with an operating system, tailored to accommodate a suitable card reader mechanism, according to some embodiments described herein. System 100 relays RFID/NFC card data (the identifier), to the shared mobile device using Bluetooth Low Energy (BLE) technology as the transport medium, which requires a RFID/NFC reader device and a BLE device. To establish a connection between RFID/NFC and BLE, the computing device uses two interfaces for RFID/NFC and BLE and also a bridge service to establish the connection between a short-range wireless device (RFID/NFC tag or access card) and a mobile device (such as tablet or iPad). The bridge device employs a bridge service which receives the unique identifiers sourced from a connected reader device, encompassing RFID/NFC readers, when a tap of RFID/NFC tags or access cards is detected. Then, the bridge service initiates a BLE connection with a nearby mobile device. The bridge service also undertakes specific computations over Received Signal Strength Indicator (RSSI) signals to refine its communication strategy, enabling it to selectively establish connections with mobile devices in close proximity.

As shown in FIG. 1A, system 100 contains a bridge device 115 that has various components associated with respective users 105, and is configured to receive the unique identifiers associated with users 105 and communicate the unique identifiers with BLE to a nearby mobile device 150. These identifiers are sourced from a connected reader device 125, such as a RFID/NFC reader, when a tap of RFID/NFC tags or access cards 110 is detected. The bridge device 115 receives a unique identifier from a short-range wireless device such as RFID/NFC tag or access card 110 using a card reader device 125. The card reader device 125 has an associated card reader interface 130 which resides on a computing device 145. The card reader device 125 passes 155 the received data from user's 105 tag or access card 110 to its related interface 130 on the computing device 145. The computing device 145 also has a BLE interface 140 which is connected 160 to a BLE device 135. Upon acquiring these identifiers, the bridge service 120 which resides on a computing device 145 initiates a BLE (Bluetooth Low Energy) connection using the BLE interface 140 to the nearby mobile device 150 by calculating proximity through the Received Signal Strength Indicator (RSSI). The bridge service 120 may handle any other required action for transferring data between card reader device 125 using its related interface (card reader interface 130) and BLE device 135 using its related interface (BLE interface 140).

FIG. 1A illustrates a high-level view of the overall architecture of an example system 100 that can be used to make a relation between RFID/NFC cards 110 and mobile devices 150 equipped with BLE. A bridge device 115 is a physical computing device 145 that consists of two hardware modules (125 and 135) and their associated software interfaces (130 and 140). One hardware device is configured for reading RFID/NFC cards 125 and an associated interface (RFID/NFC interface 130) for managing the related data. It also has another hardware device (BLE device 140) and associated software for BLE transmission (BLE interface 135).

The bridge service 120 is responsible for reading a user's unique identifiers (such as RFID/NFC tag or access card 110) from a connected device such as RFID/NFC reader 125 when the tap of a tag or access card 110 is detected and passes them to mobile device 150 in close proximity using a BLE device 140. The identifier will be used continuously for authentication purposes.

The unique identifier is a machine-readable identifier that can be read by a connected RFID/NFC reader device 125. The unique identifier can include a code or can be embodied on a device 110 which can be, for example, multiple types of short-range wireless (RFID tag or access card 110) devices such as Low Frequency (LF) RFID, High Frequency (HF) RFID (e.g., NFC), Ultra-High Frequency (UHF) RFID, Passive and Active and also Battery-Assisted Passive (BAP) RFID. The connected device can include a reader 125 that can be an external pluggable device or a built-in device inside the computing device 145.

The computing device(s) 145 can include, for example PCs (personal computers), laptops, gaming consoles, or the like.

The RFID/NFC card reader device 125, receives the unique identifier from user's 105 access card 110 and passes 155 it to its interface (RFID/NFC interface 130) that resides on computing device 145.

The bridge service 120 passes the received identifier from RFID/NFC interface 130 to a BLE interface 140 which also lives on computing device 145.

The BLE interface 140, passes 160 the unique identifier to the BLE device 135.

The BLE device 135, passes the unique identifier to the mobile device 150 in close proximity.

In system 100, user 105 provides a unique identifier such as an RFID tag or access 110 which can be transmitted through a corresponding RFID/NFC card reader device 125 to its related interface 130 and from there to a BLE device 135 using its related interface 140 with the help of bridge service 120.

Figure 1B:
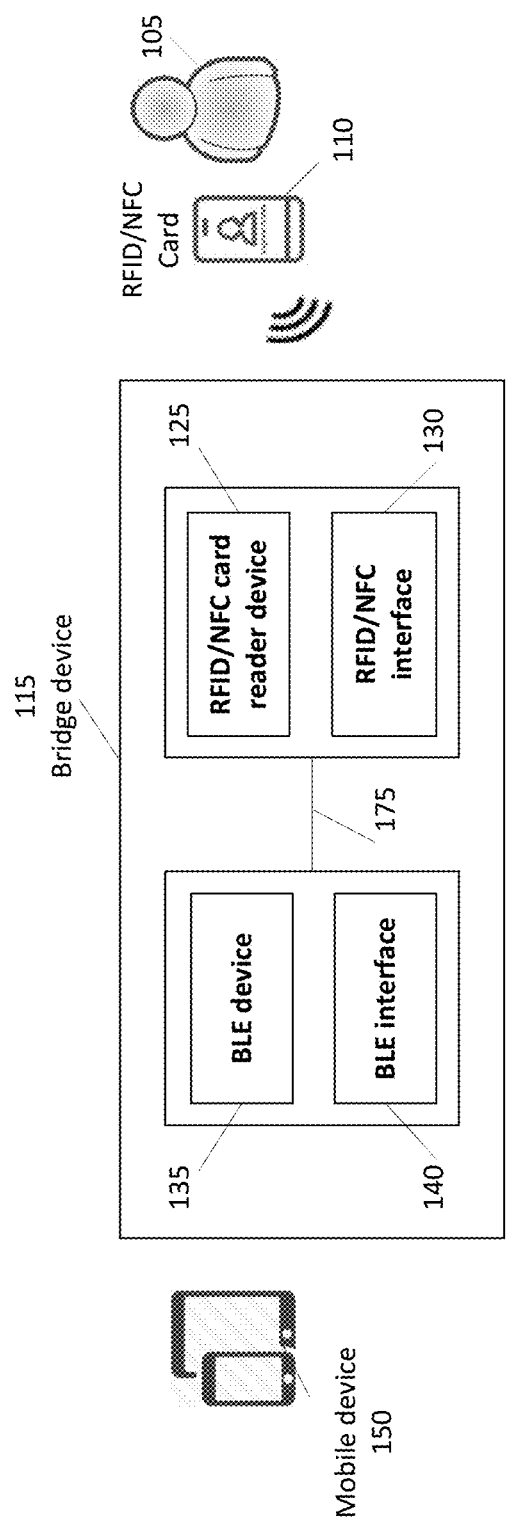
FIG. 1B shows another example system-architecture diagram for a bridge device according to some embodiments described herein.

FIG. 1B shows another example system-architecture diagram for a bridge device, according to some embodiments described herein. The bridge device can be equipped with two modules, one for reading RFID/NFC and one for handling BLE, that can communicate to each other without need for a bridge service. In FIG. 1B, system 170 illustrates a bridge device 115 system architecture that has no bridge service 120 available. In this variant, the RFID/NFC card reader interface 130 is directly connected 175 to the BLE interface 140. RFID/NFC card reader device 125 and its related interface 130 are integrated with each other and will be directly connected 175 to a BLE device 135 which is integrated with its related interface 140. The built-in interfaces 130 and 140 receive data and transmit it to each other when required. There is no bridge service 120 and no computing device 145 to embrace bridge service 120, RFID/NFC card reader interface 130 and BLE interface 140.

In system 170, user 105 provides a unique identifier such as an RFID/NFC tag or access card 110 to a RFID/NFC card reader device 125 which will be passed directly 175 by RFID/NFC card reader interface 130 to a BLE interface 140 and from there to BLE device 135 to be passed to a mobile device 150.

Figure 2:
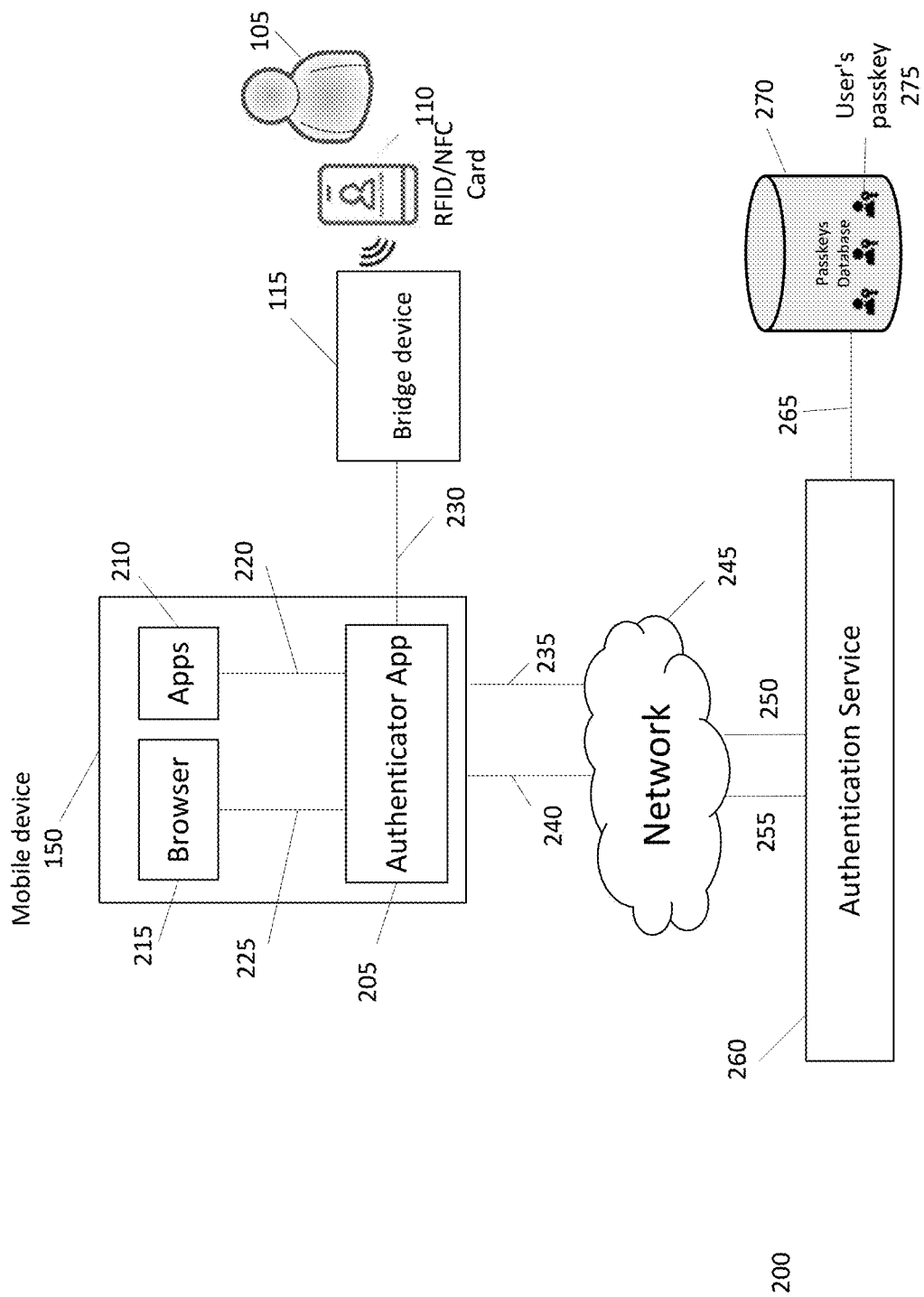
FIG. 2 shows an example system-architecture diagram for implementing a process of authentication of users on a shared mobile device which uses a bridge device to receive RFID/NFC identifier and pass it through BLE to an authenticator application that resides on a mobile device in close proximity.

In FIG. 2, system 200 illustrates a system-architecture diagram for implementing a process of authentication of users on a shared mobile device which uses a bridge device to receive RFID/NFC identifiers and pass them through BLE to an authenticator application that resides on a mobile device in close proximity, according to some embodiments. The authenticator application is configured to exchange the required authentication request and response data (including unique identifier and both registration and assertion requests and any other related requests) through a network between the user and an authentication service. The unique identifier of the RFID/NFC card will be passed to an authentication service on a local or remote network to be used to specify the associated virtually hosted authenticator of the related user and obtain the user's corresponding passkey from a passkeys database. When the user is authenticated, the authenticator application will use a dedicated browser to facilitate user logins across a list of available applications. A seamless and automatic single sign-in capability can be used to extend across all configured applications and relying parties, accessible through the mobile browser.

The shared mobile device 150 includes an authenticator application 205, a browser 215 and a collection of applications 210 that user 105 can request for login. The mobile device 150 operates an authenticator application 205, which is adept at receiving the user's 105 identifier alongside authentication requests.

The authentication process starts from a login request by user 105 containing a unique identifier coming from a RFID/NFC card 110 for a list of available applications 210 or a relying party.

The user 105 starts a login request on an authenticator application 205. The authenticator application 205 receives 230 a unique identifier from a bridge device 115 which will be provided by a user 105 with a tap of a RFID/NFC card 110.

The authenticator application 205 sends 235 the login request along with the unique identifier to the network 245 and from there 250 to an authentication service 260 that is securely hosted on a remote server across a network. The authentication service 260 handles FIDO authentication requests. The virtually hosted authenticators are under the management of the authentication service 260. Each authenticator is configured to be exclusively accessible by a single user 105 through the association of a unique identifier. This approach ensures that the authentication service 260 can interact with the authenticator, retrieve pertinent data, and execute the authentication process. For this, the authentication service 260 maps the unique identifier to a virtually hosted authenticator (security key), and returns a response back 255 to the network 245 and from there 240 to the authenticator application 205 on the mobile device 150. The authenticator application 205 sends 225 the returned response to a dedicated browser 215 to open the requested application 210 for the user 105. A single sign-in capability can be used to make pre-configured applications 210 and relying parties available for users 105 through the mobile browser 215.

The process of locating user's associated authenticator can be interpreted as mapping the user's RFID/NFC tag or access card 110 to/with the remotely hosted authenticator by authentication service 260. In an example embodiment, the authenticator application 205 may be configured to wait for user 105 to tap RFID/NFC tag or access card 110 on bridge device 115 (more precisely on a device such as RFID/NFC card reader 125) to receive 230 the identifier. The authenticator application 205 then passes 235 received data which is the user's tag or access card ID 110 that will be used as a unique identifier, to the authentication service 260 over the network (an application on the network) 245 to bind the associated authenticator (security key) to the user with the unique identifier to process the authentication request.

The authentication service or application 260, securely hosted on a remote server across a network, hosts, manages and safeguards authenticator data. It establishes seamless mappings and associations between users 105 and their unique identifiers, derived from sources such as RFID/NFC tags 110, access cards, or even generated through alternative means like biometric sensors. The authentication service 260 processes the authentication request using the associated authenticator, and upon successful authentication, the authentication service 260 will receive 265 the corresponding user passkey 275 from the passkeys database 270. The authentication service 260 will then provide a response with the user's passkey 275 and relay it back 255 to the authenticator application 205 as the authentication response. The authenticator application 205 sends 225 the received request to a browser 215, enabling the user 105 to login to a requested application 210. In some embodiments, the authenticator application 205 and the authentication service 260, can collaborate to provide a Single Sign-On (SSO) functionality for either a selection or all of the configured applications 210 or relying parties residing on the mobile device 150. The SSO capability simplifies user interaction by eliminating the need for repeated authentications.

Passkeys 275 will remain on the shared mobile device 150 for as long as necessary and can be used for the authentication purposes through a standard passkey.

In some embodiments, the user 105 can manually demand sign-out to remove passkeys 275 from the shared mobile device 150 so that the next user can bring their passkeys (e.g., card or biometric) to the shared mobile device 150.

In some embodiments, automatic sign-out can be achieved so the passkey(s) 275 will be removed automatically on a timely basis (e.g., like the end of a worker shift) or after a one-time use on a specific application.

The response to a login request may open an application 210 directly without the intervention of a browser 215.

The network 245 can include any type or collection of networks, such as a personal area network, local area network, wide area network, or the Internet.

Figure 3:
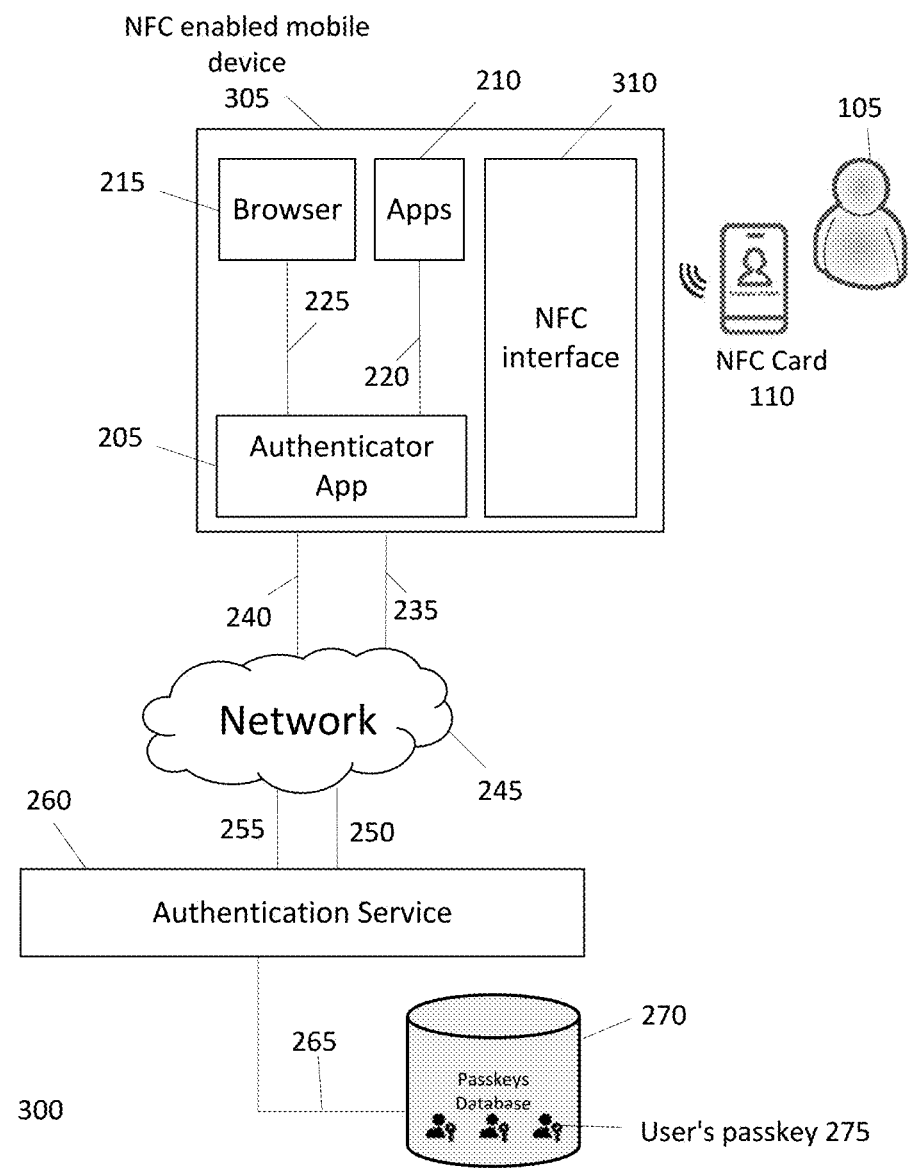
FIG. 3 shows an example system-architecture diagram for implementing a process of authentication of users on a shared mobile device which will receive the unique identifier from a direct tap of the NFC-enabled card on the NFC enabled mobile device (e.g. built-in NFC interface) according to some embodiments described herein.

In FIG. 3, system 300 illustrates a system-architecture diagram for implementing a process of authentication of users on a shared mobile device which will receive the unique identifier from a direct tap of the NFC-enabled card on the NFC enabled mobile device (built-in NFC interface), according to some embodiments described herein. The mobile device is equipped with an NFC interface (built-in NFC interface) which extracts the identifier from the user's card and will pass it to the authenticator application that resides on the mobile device in close proximity. The unique identifier will be used to pinpoint an associated remote authenticator of the related user. The authenticator application is responsible to exchange the authentication requests (both registration and assertion requests and any other related requests) through a network with authentication service. When an authentication response is received by the authenticator application, it will use a dedicated browser to facilitate user logins and access across a list of available applications. In this scenario, a single sign-in capability can also be used to make all the configured applications and relying parties accessible for users through the mobile browser.

FIG. 3 illustrates a system 300 architecture for an authentication process for shared NFC enabled mobile devices (with built-in NFC interface) 305. In this architecture, the mobile device is an NFC enabled device 305 which is equipped with an internal (built-in) NFC interface 310. In this architecture, the authenticator application 205 can integrate with the NFC interface 310 to directly receive the authenticator identifier.

In the architecture of FIG. 300, no bridge device 115 is present and the user 105 can directly tap the NFC card 110 on the NFC enabled mobile device 305. The built-in NFC interface 310 receives the unique identifier of the NFC card 110 and pass it to the authenticator application 205. In continue, the authenticator application 205 installed on a mobile device 150 receives an authentication request originating from a relying party 210. Subsequently, it engages in the retrieval and identification of the unique identifier directly from the NFC interface 310. Once the unique identifier is obtained, the authenticator application 205 proceeds to establish communication with the authentication service 260 via a network connection 245 (application residing on the network infrastructure). The authenticator application 205 sends the authentication request to the authentication service 260 and awaits the corresponding authentication response. The authentication service 260 processes the authentication request using the associated authenticator, and upon successful authentication, the authentication service 260 will receive 265 the corresponding user passkey 275 from the passkeys database 270. The authentication service 260 will then provide a response with the user's passkey 275 and relay it back 255 to the authenticator application 205 as the authentication response. Upon receipt of the authentication response from the authentication service 260, the authenticator application 205 relays the pertinent response 255 back to the relying party 210.

The authentication service 260 maps the user's 105 unique identifier to the associated remote authenticator (security key) and returns the authentication response 255 back to the network and from there 240 to the authenticator application 205. The authenticator application 205 uses a dedicated browser 215 (and optionally a single sign-in capability) to log the user 105 into an application 210 from a list of available applications 210.

Passkeys 275 will remain on the shared mobile device 150 for as long as necessary and can be used for the authentication purposes through a standard passkey.

In some embodiments, the user 105 can manually demand sign-out to remove passkeys 275 from the shared mobile device 150 so that the next user can bring their passkeys (e.g., card or biometric) to the shared mobile device 150.

In some embodiments, automatic sign-out can be achieved so the passkey(s) 275 will be removed automatically on a timely basis (e.g., like the end of a worker shift) or after a one-time use on a specific application.

Figure 4:
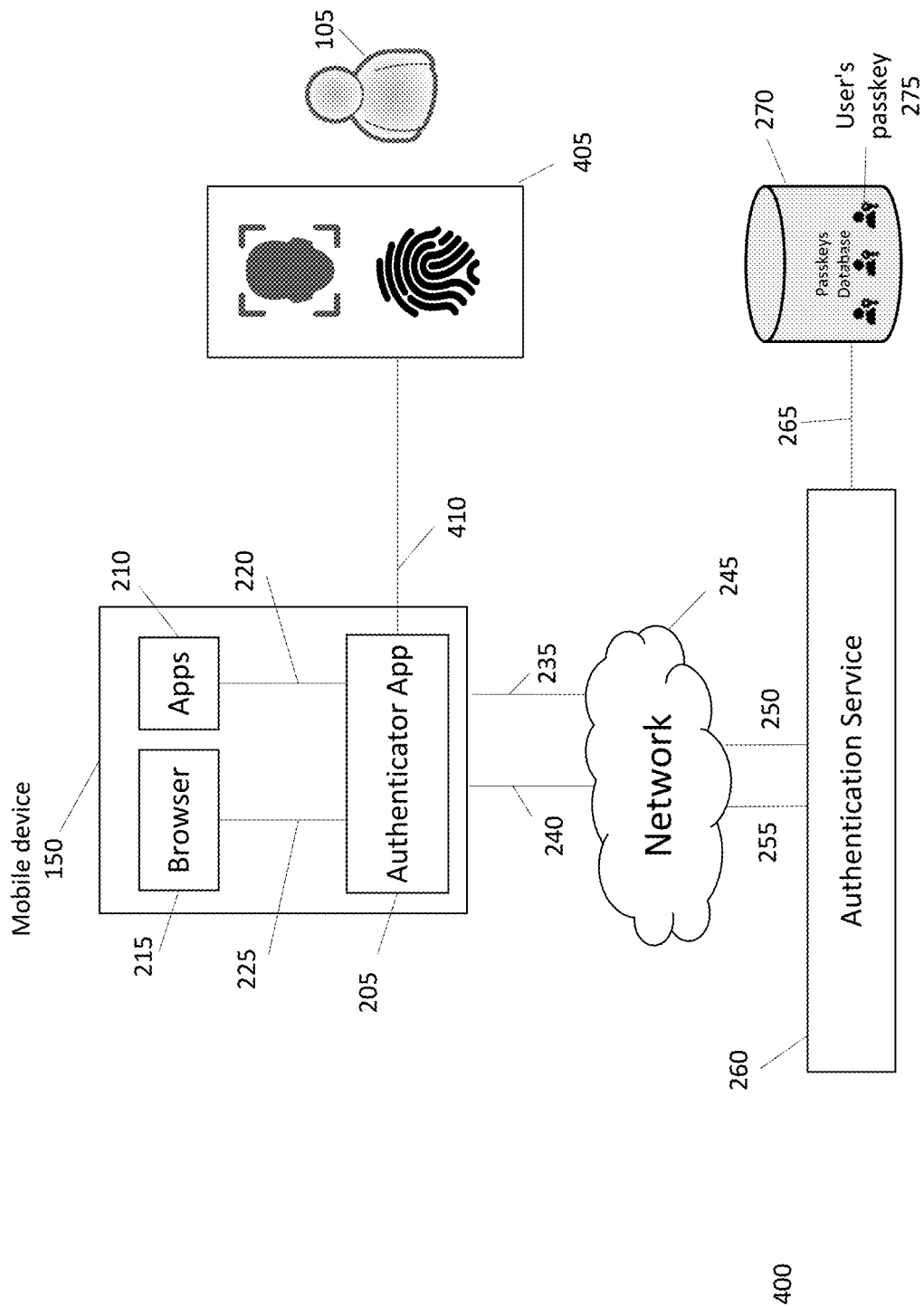
FIG. 4 shows an example system-architecture diagram for implementing a process of authentication of users on a shared mobile device using biometric data as an identifier according to some embodiments described herein.

FIG. 4 shows an example system-architecture diagram for implementing a process of authentication of users on a shared mobile device using biometric data as an identifier, according to some embodiments described herein. The authenticator application is configured to exchange the required authentication request and response data (including unique identifier and both registration and assertion requests and any other related requests) through a network between the user and an authentication service. The unique identifier of user biometrics (e.g., fingerprint, face) can be used to verify the user and consequently obtain and send the user passkeys into the shared mobile device for authentication purposes. The unique identifier will be passed to an authentication service on a local or remote network to be used to specify the associated virtually hosted authenticator of the related user and obtain the user's corresponding passkey from a passkeys database. When the user is authenticated, the authenticator application will use a dedicated browser to facilitate user logins across a list of available applications. A seamless and automatic single sign-in capability can be used to extend across all configured applications and relying parties, accessible through the mobile browser.

The shared mobile device 150 includes an authenticator application 205, a browser 215 and a collection of applications 210 that user 105 can request for login. The mobile device 150 operates an authenticator application 205, which is adept at receiving the user's 105 identifier alongside authentication requests.

The authentication process starts from a login request by user 105 containing a unique identifier coming from the user's biometric data 405 for a list of available applications 210 or a relying party.

The user 105 starts a login request on an authenticator application 205. The authenticator application 205 receives 410 a unique identifier from biometric data which can be provided by a user 105 through various interfaces 410, such as a mobile built-in camera or fingerprint sensor.

The authenticator application 205 sends 235 the login request along with the unique identifier to the network 245 and from there 250 to an authentication service 260 that is securely hosted on a remote server across a network. The authentication service 260 handles FIDO authentication requests. The virtually hosted authenticators are under the management of the authentication service 260. Each authenticator is configured to be exclusively accessible by a single user 105 through the association of a unique identifier. This approach ensures that the authentication service 260 can interact with the authenticator, retrieve pertinent data, and execute the authentication process. For this, the authentication service 260 maps the unique identifier to a virtually hosted authenticator (security key), and returns a response back 255 to the network 245 and from there 240 to the authenticator application 205 on the mobile device 150. The authenticator application 205 sends 225 the returned response to a dedicated browser 215 to open the requested application 210 for the user 105. A single sign-in capability can be used to make pre-configured applications 210 and relying parties available for users 105 through the mobile browser 215.

The process of locating the user's associated authenticator can be interpreted as mapping the user's biometric data 405 to/with the remotely hosted authenticator by authentication service 260. In an example embodiment, the authenticator application 205 may be configured to wait for user 105 to scan their fingerprint 405 on interface 410 to receive the identifier. The authenticator application 205 then passes 235 received data which is the user's fingerprint 405 that will be used as a unique identifier, to the authentication service 260 over the network (an application on the network) 245 to bind the associated authenticator (security key) to the user with the unique identifier to process the authentication request.

The authentication service or application 260, securely hosted on a remote server across a network, hosts, manages and safeguards authenticator data. It establishes seamless mappings and associations between users 105 and their unique identifiers, derived from sources such as RFID/NFC tags 110, access cards, or even generated through alternative means like biometric sensors. The authentication service 260 processes the authentication request using the associated authenticator, and upon successful authentication, the authentication service 260 will receive 265 the corresponding user passkey 275 from the passkeys database 270. The authentication service 260 will then provide a response with the user's passkey 275 and relay it back 255 to the authenticator application 205 as the authentication response. The authenticator application 205 sends 225 the received request to a browser 215, enabling the user 105 to login to a requested application 210. In some embodiments, the authenticator application 205 and the authentication service 260, can collaborate to provide a Single Sign-On (SSO) functionality for either a selection or all of the configured applications 210 or relying parties residing on the mobile device 150. The SSO capability simplifies user interaction by eliminating the need for repeated authentications.

Passkeys 275 will remain on the shared mobile device 150 for as long as necessary and can be used for the authentication purposes through a standard passkey.

In some embodiments, the user 105 can manually demand sign-out to remove passkeys 275 from the shared mobile device 150 so that the next user can bring their passkeys (e.g., card or biometric) to the shared mobile device 150.

In some embodiments, automatic sign-out can be achieved so the passkey(s) 275 will be removed automatically on a timely basis (e.g., like the end of a worker shift) or after a one-time use on a specific application.

The response to a login request may open an application 210 directly without the intervention of a browser 215.

The network 245 can include any type or collection of networks, such as a personal area network, local area network, wide area network, or the Internet.

Figure 5:
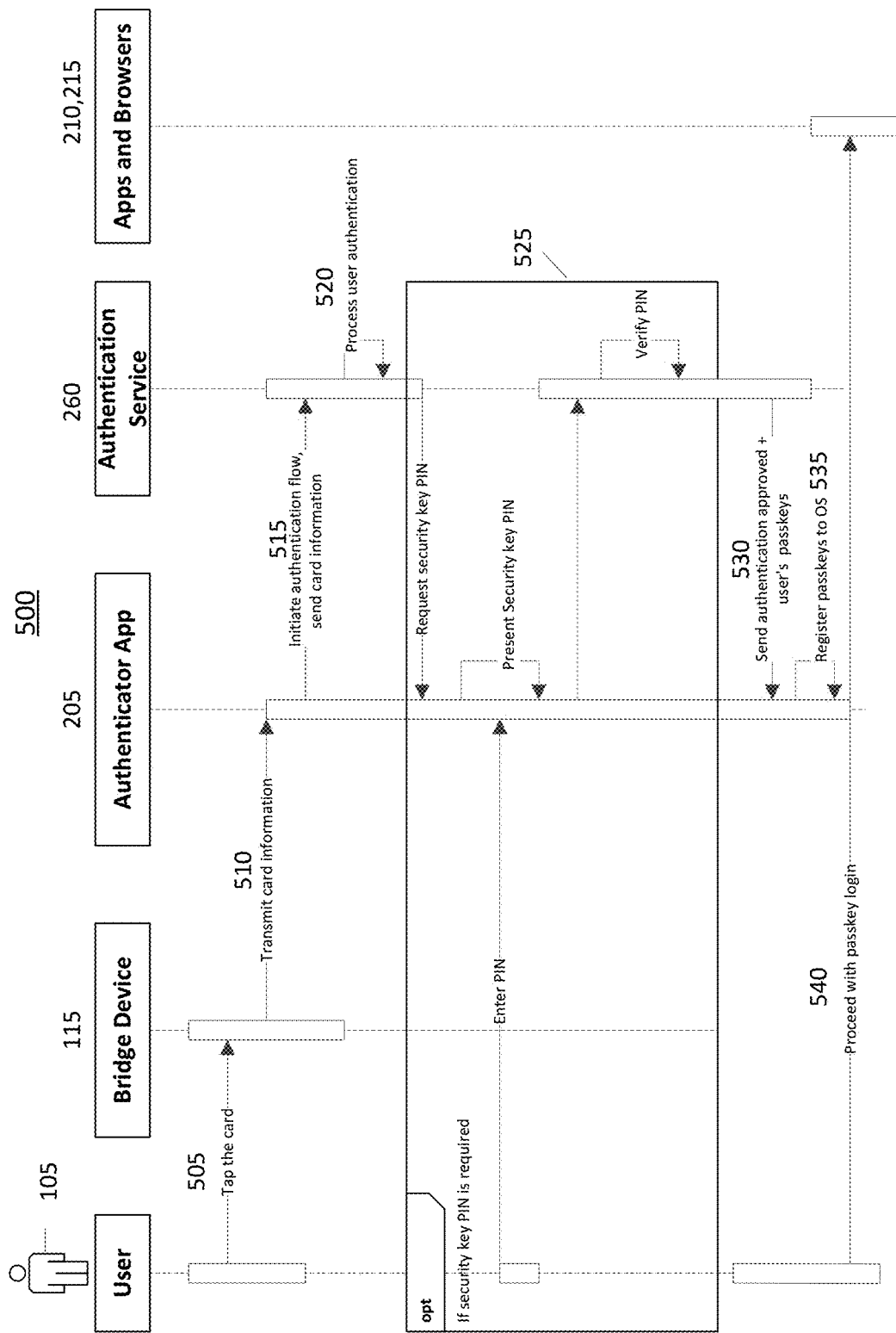
FIG. 5 shows an example authentication process diagram for the example system-architecture of FIG. 2.

FIG. 5 shows an example authentication process for the example system-architecture of FIG. 2.

At 505, the user 105 starts a login request by tapping a card (e.g., RFID/NFC tag or access card) 110 on bridge device 115 (or more precisely, on a device such as RFID/NFC card reader 125) to receive 230 the identifier.

At 510, the bridge device 115 transmits the unique identifier and card information obtained at 505 to authenticator application 205.

At 515, the authenticator application 205 sends 235 the login request along with the unique identifier and card information to the network 245 and from there 250 to an authentication service 260 that is securely hosted on a remote server across a network. The authentication service 260 handles FIDO authentication requests. The virtually hosted authenticators are under the management of the authentication service 260. Each authenticator is configured to be exclusively accessible by a single user 105 through the association of a unique identifier.

At 520, the authentication service 260 processes the authentication request using the associated authenticator, and upon successful authentication, the authentication service 260 will receive 265 the corresponding user passkeys 275 from the passkeys database 270.

Optionally, at 525, if a security key PIN is required, the authentication service 260 requests for a security key PIN after it maps the unique identifier to a virtually hosted authenticator (security key). The user 105 may enter the PIN into the bridge device 115, and the PIN will be presented to the authenticator application 205. The authenticator application 205 sends 235 the PIN to the network 245 and from there 250 to the authentication service 260 to verify the PIN. Upon successful verification, the authentication service 260 proceeds to step 530.

At 530, the authentication service 260 returns an authentication approved response with the user's passkey 275 back 255 to the network 245 and from there 240 to the authenticator application 205 on the mobile device 150.

At 535, the authenticator application 205 registers the user's passkeys 375 to the operating system, typically configuring the device to function as platform authenticator to work with the OS to distribute the passkeys to other apps, browsers, and services. This integration ensures that the passkeys are readily available throughout the system, allowing native apps and browsers to use the passkeys for seamless authentication. By leveraging this configuration, the device becomes a platform authenticator, providing standard passkey functionality across various applications without repeated logins.

At 540, the user 105 is granted access and may proceed with passkey login to their requested app(s). The authenticator application 205 sends 225 the received request to a browser 215, enabling the user 105 to login to a requested application 210.

Figure 6:
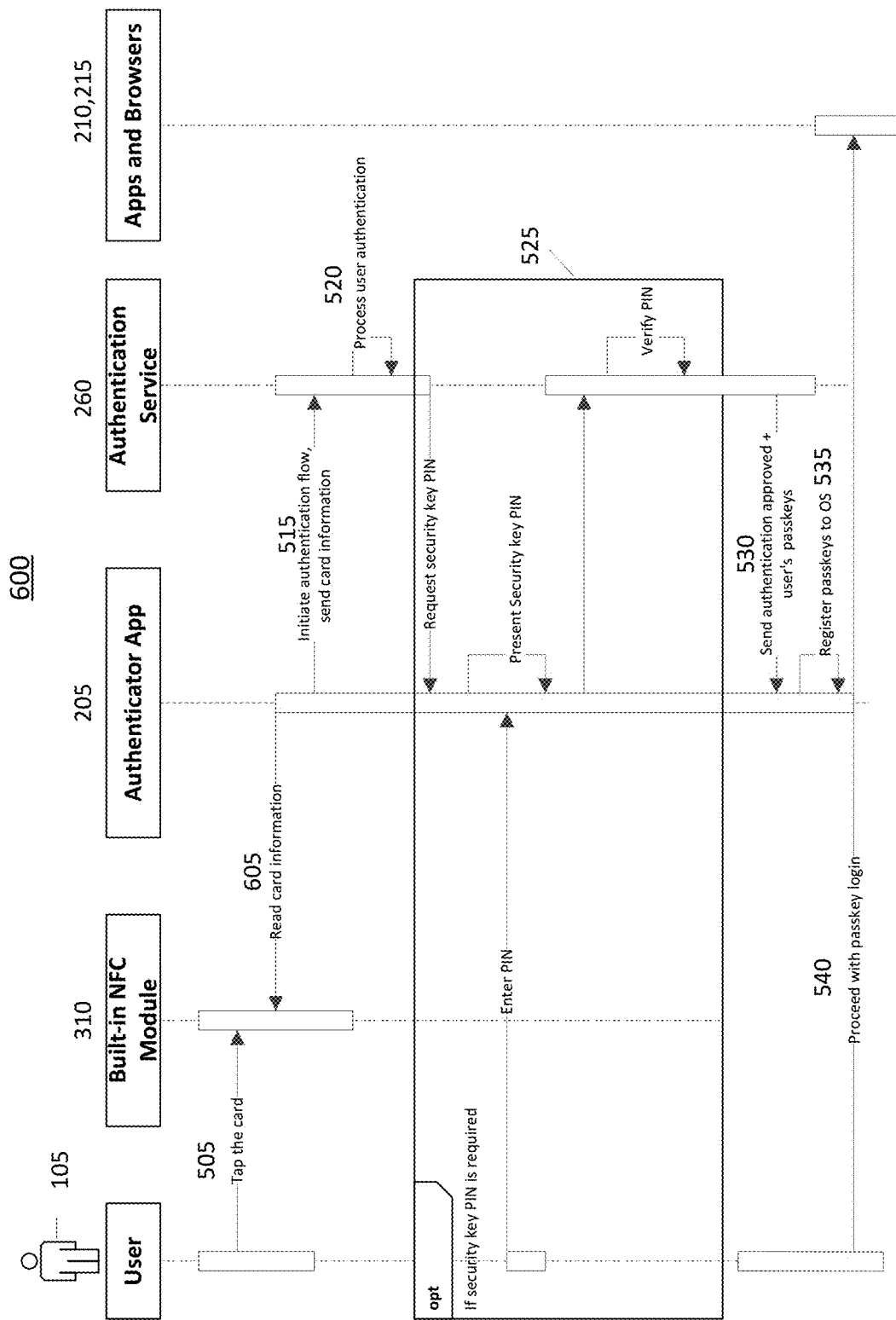
FIG. 6 shows an example authentication process diagram for the example system-architecture of FIG. 3.

FIG. 6 shows an example authentication process for the example system-architecture of FIG. 3.

At 505, the user 105 starts a login request by tapping a card (e.g., RFID/NFC tag or access card) 110 at the built-in NFC module 310 to receive the unique identifier of the card 110.

At 605, the authenticator app 205 directly reads and retrieves the unique identifier and card 110 information from the built-in NFC module 310.

At 515, the authenticator application 205 sends 235 the login request along with the unique identifier and card information to the network 245 and from there 250 to an authentication service 260 that is securely hosted on a remote server across a network. The authentication service 260 handles FIDO authentication requests. The virtually hosted authenticators are under the management of the authentication service 260. Each authenticator is configured to be exclusively accessible by a single user 105 through the association of a unique identifier. The authenticator application 205 awaits an authentication response from the authentication service 260.

At 520, the authentication service 260 maps the user's 105 unique identifier to the associated remote authenticator (security key). Then the authentication service 260 processes the authentication request using the associated authenticator, and upon successful authentication, the authentication service 260 will receive 265 the corresponding user passkey 275 from the passkeys database 270.

Optionally, at 525, if a security key PIN is required, the authentication service 260 requests for a security key PIN after it maps the unique identifier to a virtually hosted authenticator (security key). The user 105 may enter the PIN into the built-in NFC module 310, and the PIN will be presented to the authenticator application 205. The authenticator application 205 sends 235 the PIN to the network 245 and from there 250 to the authentication service 260 to verify the PIN.

Upon successful verification, the authentication service 260 proceeds to step 530.

At 530, the authentication service 260 returns an authentication approved response with the user's passkey 275 back 255 to the network 245 and from there 240 to the authenticator application 205 on the mobile device 150.

At 535, the authenticator application 205 registers the user's passkeys 375 to the operating system.

At 540, the user 105 is granted access and may proceed with passkey login to their requested app(s). The authenticator application 205 sends 225 the received request to a browser 215, enabling the user 105 to login to a requested application 210.

Figure 7:
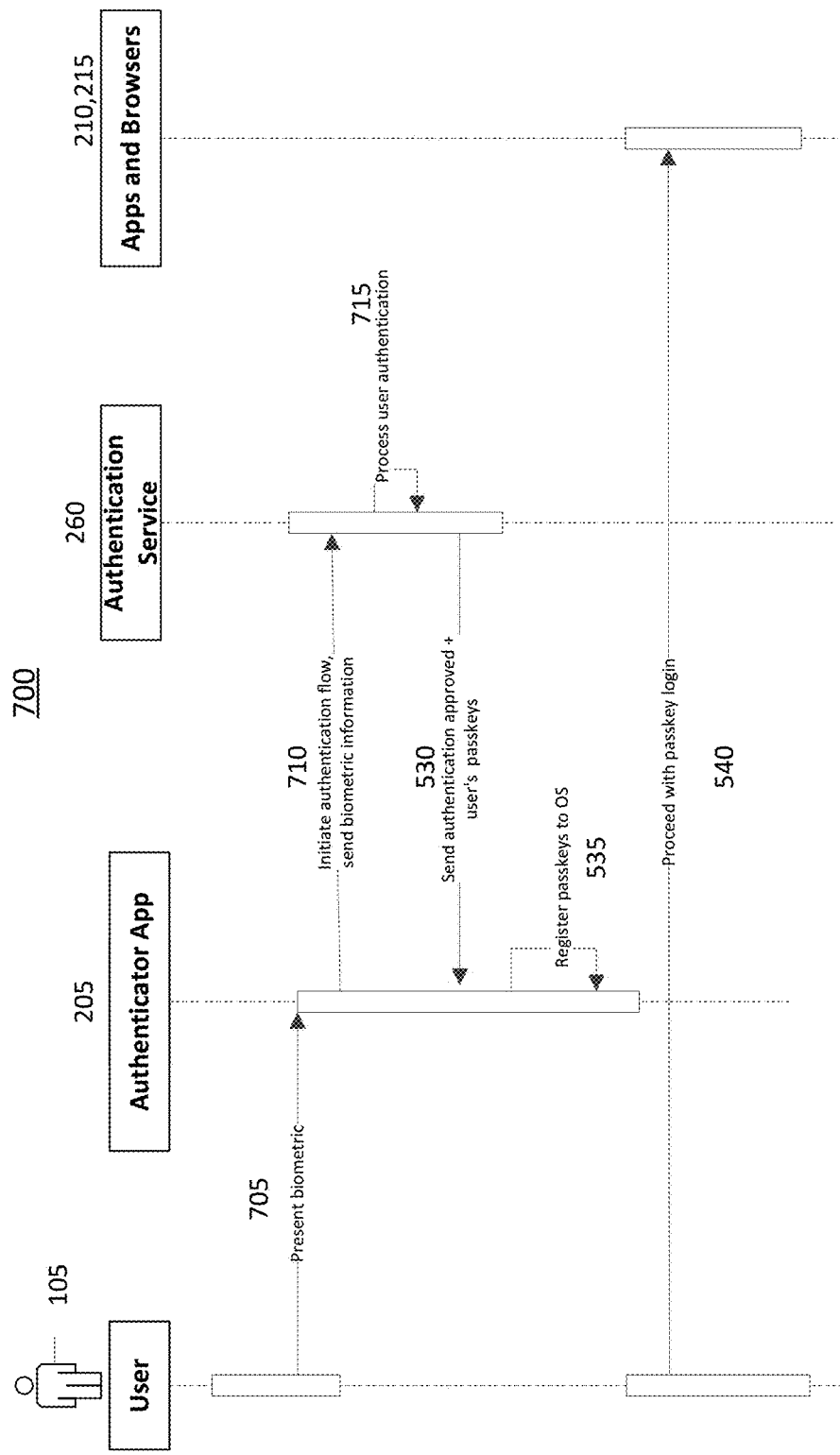
FIG. 7 shows an example authentication process diagram for the example system-architecture of FIG. 4.

FIG. 7 shows an example authentication process for the example system-architecture of FIG. 4.

At 705, the user 105 starts a login request on the authenticator application 205 by providing a biometric to interfaces 410, such as a mobile built-in camera or fingerprint sensor. For example, the user 105 could present their finger to an interface 410 for the authenticator application 205 to obtain a unique identifier from the biometric data.

At 710, the authenticator application 205 sends 235 the login request along with the unique identifier from the user's biometric data to the network 245 and from there 250 to an authentication service 260 that is securely hosted on a remote server across a network. The authentication service 260 handles FIDO authentication requests. The virtually hosted authenticators are under the management of the authentication service 260. Each authenticator is configured to be exclusively accessible by a single user 105 through the association of a unique identifier.

At 715, the authentication service 260 maps the user's 105 unique identifier to the associated remote authenticator (security key). Then the authentication service 260 processes the authentication request using the associated authenticator, and upon successful authentication, the authentication service 260 will receive 265 the corresponding user passkey 275 from the passkeys database 270.

At 530, the authentication service 260 returns an authentication approved response with the user's passkey 275 back 255 to the network 245 and from there 240 to the authenticator application 205 on the mobile device 150.

At 535, the authenticator application 205 registers the user's passkeys 375 to the operating system.

At 540, the user 105 is granted access and may proceed with passkey login to their requested app(s). The authenticator application 205 sends 225 the received request to a browser 215, enabling the user 105 to login to a requested application 210.

Embodiments described herein provide systems and methods for secure and efficient user authentication on shared mobile devices, such as smartphones and tablets. This solution leverages the capabilities of RFID/NFC cards, access cards, and biometric sensors to establish seamless and personalized user authentication. An authenticator application communicates with a remote authentication service to either register passkeys locally for platform-wide use or forward authentication requests for remote processing, depending on configuration. The authenticator application orchestrates communication between the user, mobile device, and authentication service, creating a secure framework for various applications. Upon successful authentication, the system transforms the mobile device into a platform authenticator, making passkeys available across native apps and browsers. This system enhances security by integrating user identifiers with hosted authenticators that are securely managed by the authentication service. By tapping NFC-enabled cards or utilizing a bridge device for data extraction, users can seamlessly engage with the shared mobile device environment, benefitting from robust security measures associated with FIDO authentication. The system encompasses the bridge device, which serves as an intermediary for data transmission, efficiently communicating between RFID/NFC devices and mobile devices using Bluetooth Low Energy (BLE) technology. Biometric authentication operates similarly to RFID/NFC-based methods, where user identity is verified through an authentication service, and passkey support is provided for that specific user. The authentication service hosts user authenticators and passkeys in a secure, transportable format, configurable to be fetched to shared mobile devices or handled remotely. This system allows adaptable, FIDO2/WebAuthn security protocols across multiple devices, enhancing user convenience while ensuring system integrity and security in shared device scenarios.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A system for secure user authentication on shared mobile devices, comprising:
   an authenticator application installed on a shared mobile device, configured to:
   transmit authentication requests and data uniquely identifying a user such as Radio Frequency Identification (RFID), Near-field Communication (NFC) or biometric data;
   a remote authentication service hosting authenticators and passkeys, wherein the remote authentication service is configured to:
   map unique identifiers to the virtually hosted authenticators;
   process the authentication requests received from the authenticator application using the virtually hosted authenticators to verify the user authentication; and
   transmit authentication responses to the authenticator application;
   wherein, upon successful authentication, the authenticator application is further configured to enable the mobile device to function as a platform authenticator, making the passkeys available for native apps, browsers, and services to perform authentication, wherein the mobile device can either:
   retrieve and register the user's passkeys with the operating system for local use in authentication processes; or
   forward passkey authentication requests to the remote authentication service for processing, and return the authentication response to a relying party.

2. The system of claim 1 wherein the data uniquely identifying the user comprises one or more unique identifiers, the system further comprising a bridge device communicating, over a connection, with an NFC/RFID reader for extracting the unique identifiers and the mobile device for providing the unique identifiers, the bridge device for facilitating data transfer between the reader and the mobile device for the authentication requests.

3. The system of claim 1, wherein, for biometric-based user authentication, the authenticator application is configured to read the biometric data directly from built-in sensors on the mobile device or from external sensors via a mobile operating system-supported transport protocol, such as a cable or wireless connection.

4. The system of claim 1, wherein biometric authentication operates similar to NFC/RFID card-based identification, the authentication service processing the input biometric data to verify the user.

5. The system of claim 1 wherein the mobile device is an NFC-enabled mobile device integrating the reader to directly receive the unique identifiers from NFC tags or access cards.

6. The system of claim 1 wherein the authenticator application resides on an NFC-enabled mobile device integrating the reader to receive the unique identifiers directly from NFC tags or access cards.

7. The system of claim 1, wherein a reader or a bridge device extracts the unique identifiers from one or more of RFID/NFC cards, access cards, and tags.

8. The system of claim 1, wherein the connection is a network connection using Bluetooth Low Energy (BLE).

9. The system of claim 4, wherein the bridge device comprises a Bluetooth Low Energy (BLE) module, wherein the authenticator application communicates with the bridge device over BLE to receive identifier data.

10. The system of claim 1, wherein the authentication requests are initiated from relying party applications or services, wherein the authenticator application enables the shared mobile device to function as platform authenticator, or to provide single sign-on access to the applications or services upon successful authentication.

11. The system of claim 1, wherein each of the virtually hosted authenticators is associated with a user through a unique identifier.

12. The system of claim 1 wherein the authenticator application captures and transmits unique biometric identifiers from built-in or external sensors for user verification, wherein the remote authentication service associates biometric identifiers with the virtually hosted authenticators to facilitate secure and personalized user authentication through the use of biometric data.

13. The system of claim 1, wherein the bridge device calculates proximity through RSSI signals to establish BLE connections with nearby mobile devices including the mobile device with the authenticator application.

14. The system of claim 1 further comprising a secure connection between the remote authentication service and the authenticator application for seamless communication between the authenticator application and the remote authentication service for streamlined user authentication.

* * * * *